(12) United States Patent
Wunderlich et al.

(10) Patent No.: US 10,018,842 B2
(45) Date of Patent: Jul. 10, 2018

(54) HEADS-UP DISPLAY FOR A MOTOR VEHICLE, MOTOR VEHICLE WITH A HEADS-UP DISPLAY, AND METHOD FOR ARRANGING A HEADS-UP DISPLAY IN A MOTOR VEHICLE

(71) Applicant: AUDI AG, Ingolstadt (DE)

(72) Inventors: Matthias Wunderlich, Ingolstadt (DE); Tobias Schumm, Fremdingen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/512,437

(22) PCT Filed: Sep. 3, 2015

(86) PCT No.: PCT/EP2015/001775
§ 371 (c)(1),
(2) Date: Mar. 17, 2017

(87) PCT Pub. No.: WO2016/041619
PCT Pub. Date: Mar. 24, 2016

(65) Prior Publication Data
US 2017/0276937 A1    Sep. 28, 2017

(30) Foreign Application Priority Data
Sep. 19, 2014    (DE) .......................... 10 2014 013 967

(51) Int. Cl.
*G02B 27/01* (2006.01)
*B60J 1/02* (2006.01)
(Continued)

(52) U.S. Cl.
CPC ............ *G02B 27/0101* (2013.01); *B60J 1/02* (2013.01); *B60R 1/10* (2013.01); *B60R 1/12* (2013.01);
(Continued)

(58) Field of Classification Search
CPC ............ G02B 27/0101; G02B 27/0149; G02B 2027/011; G02B 2027/0156; B60R 1/12;
(Continued)

(56) References Cited

U.S. PATENT DOCUMENTS 5,805,119 A * 9/1998 Erskine .................. G09G 3/346
345/611
2002/0012173 A1    1/2002 Aoki et al.
(Continued)

FOREIGN PATENT DOCUMENTS

DE          103 06 087 A1    8/2004
DE    10 2004 021 026 B3    9/2005
(Continued)

OTHER PUBLICATIONS

German Office Action dated May 19, 2015 from German Patent Application No. 10 2014 013 967.0, 5 pages.
(Continued)

*Primary Examiner* — Premal R Patel
(74) *Attorney, Agent, or Firm* — Staas & Halsey LLP

(57) ABSTRACT

At least one imaging unit for emitting an image in the form of a beam path and at least one mirror module for deflecting the beam path which is emitted by the imaging unit are included in a head-up display for a motor vehicle. The mirror module includes at least two different mirrors which are movable into the beam path, and a respective curvature of the mirrors is matched to respective vehicle-specific windshield variants. The head-up display may be arranged in the motor vehicle by selecting one of the mirrors whose curvature is matched to the windshield variant, embodied in a vehicle-specific manner, and arranging the selected mirror in a region through which the beam path extends in the case of an activated imaging unit.

20 Claims, 1 Drawing Sheet

(51) Int. Cl.
   *B60R 1/10* (2006.01)
   *B60R 1/12* (2006.01)
(52) U.S. Cl.
   CPC .. *G02B 27/0149* (2013.01); *B60R 2001/1253* (2013.01); *B60R 2300/205* (2013.01); *B60R 2300/308* (2013.01); *G02B 2027/011* (2013.01); *G02B 2027/0156* (2013.01)
(58) Field of Classification Search
   CPC ............... B60R 1/10; B60R 2300/308; B60R 2001/1253; B60R 2300/205; B60J 1/02
   See application file for complete search history.

(56) References Cited

U.S. PATENT DOCUMENTS

| | | | | |
|---|---|---|---|---|
| 2009/0135253 | A1* | 5/2009 | Augst | B60R 1/00 348/148 |
| 2011/0170023 | A1* | 7/2011 | Ishida | B60K 35/00 348/837 |
| 2013/0194518 | A1 | 8/2013 | Mousse et al. | |
| 2013/0265646 | A1* | 10/2013 | Sakai | G02B 27/01 359/631 |
| 2015/0077312 | A1* | 3/2015 | Wang | G02B 27/017 345/7 |
| 2016/0193922 | A1* | 7/2016 | Kuzuhara | G03B 21/28 345/7 |

FOREIGN PATENT DOCUMENTS

| | | |
|---|---|---|
| DE | 10 2007 010 381 A1 | 9/2008 |
| DE | 10 2007 047 232 A1 | 4/2009 |
| DE | 10 2010 002 956 A1 | 9/2011 |
| DE | 10 2014 013 967.0 | 9/2014 |
| EP | 0 450 553 A2 | 10/1991 |
| EP | 1 291 701 A1 | 3/2003 |
| WO | PCT/EP2015/001775 | 9/2015 |

OTHER PUBLICATIONS

International Search Report dated Nov. 12, 2015 from International Patent Application No. PCT/EP2015/001775, 3 pages.
English translation of International Preliminary Report on Patentability dated Mar. 23, 2017 from International Patent Application No. PCT/EP2015/001775, 8 pages.

* cited by examiner

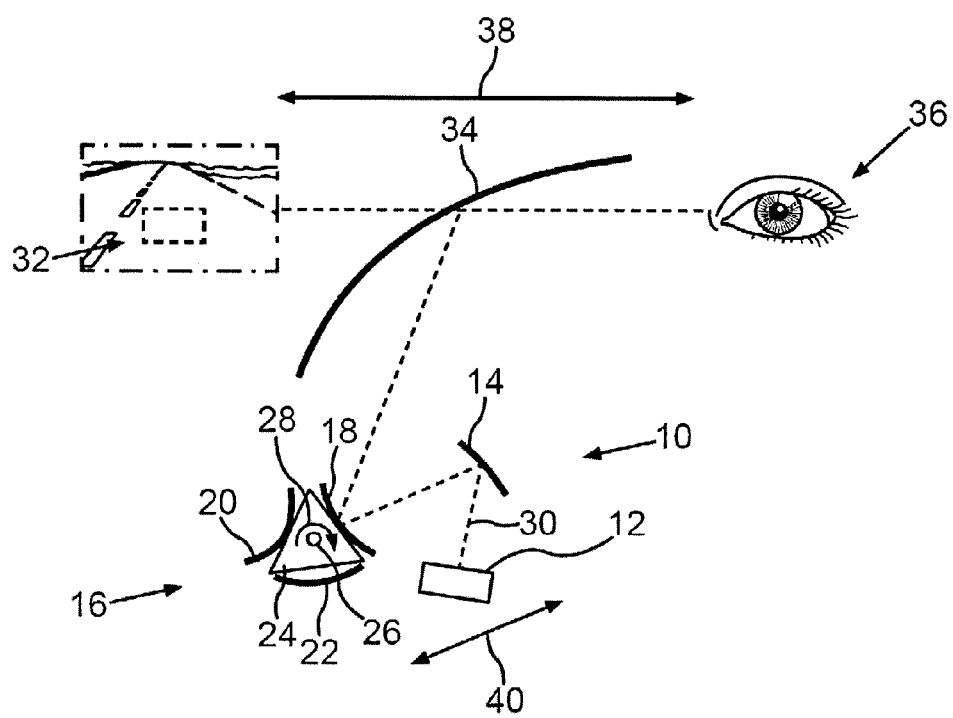

HEADS-UP DISPLAY FOR A MOTOR VEHICLE, MOTOR VEHICLE WITH A HEADS-UP DISPLAY, AND METHOD FOR ARRANGING A HEADS-UP DISPLAY IN A MOTOR VEHICLE

CROSS REFERENCE TO RELATED APPLICATIONS

This application is the U.S. national stage of International Application No. PCT/EP2015/001775, filed Sep. 3, 2015. The International Application claims the priority benefit of German Application No. 10 2014 013 967.0 filed on Sep. 19, 2014. Both the International Application and German Application are incorporated by reference herein in their entirety.

BACKGROUND

Described herein is a head-up display for a motor vehicle. Furthermore, described herein is a motor vehicle including a head-up display and a method for arranging a head-up display in a motor vehicle.

German Patent Application No. 10 2010 002 956 A1 describes a head-up display for a motor vehicle including an imaging unit and a mirror module for deflecting a beam path which is able to be emitted by the imaging unit. The mirror module includes different mirror areas which are movable into the beam path. This serves to facilitate simple and quick switching of the content displayed by using the head-up display between various focusing planes or representation modes.

German Patent Application No. 10 2007 047 232 A1 likewise describes a head-up display for a motor vehicle, wherein a mirror of the head-up display may be positioned flexibly in order to facilitate installation in various vehicle types.

German Patent Application No. 10 2007 010 381 A1 also describes a head-up display for a motor vehicle, wherein the head-up display includes a basic assembly with two mirrors for installation in various vehicle types.

SUMMARY

An aspect of the head-up display described herein is to facilitate the use of the head-up display in different vehicle types in a simplified manner.

Additional aspects and/or advantages will be set forth in part in the description which follows and, in part, will be apparent from the description, or may be learned by practice of the disclosed embodiments.

The head-up display for a motor vehicle described herein includes at least one imaging unit for emitting an image in the form of a beam path and at least one mirror module for deflecting the beam path which is able to be emitted by the imaging unit, wherein the mirror module includes at least two different mirrors which are movable into the beam path. Here, the head-up display described herein is distinguished by virtue of a respective curvature of the mirrors being matched to respective vehicle-specific windshield variants. The head-up display described herein may also, by all means, include a plurality of imaging units and mirror modules.

Thus, the at least one imaging unit is embodied so as to display a certain image, for example speed specifications, navigation information or the like. Here, the mirror module is arranged in such a way that a driver may usually see by way of the mirror module the image displayed by using the imaging unit. Then, the driver perceives the image, for example, as levitating at 2 meters distance over a hood of the relevant motor vehicle.

Thus, provision is made for the head-up display to include a mirror module with differently embodied angles of curvature. This renders it possible to use the head-up display for different vehicles and panes. The actual assembly, from which the head-up display is composed, may therefore be used independently of vehicle variant and, in particular, independently of windshield variant as well, without needing to replace any components of the head-up display. Here, the number of different mirrors of the mirror module is not restricted to the at least two different mirrors. Instead, provision may also be made for the mirror module to include more than two mirrors, for example three, four or else five different mirrors, the respective curvatures of which are matched to the respective vehicle-specific windshield variants. The more mirrors are included by the mirror module with different curvatures in each case, the more universally the entire head-up display may be used in a vehicle variant and windshield variant overarching manner, without replacing any components.

An advantageous embodiment provides for the respective curvature of the mirrors to be matched to respective vehicle-specific curvatures of the windshield variants. As a result, it is possible to take into account, in particular, the fact that different windshield variants with different degrees of curvature are used in different vehicles, such that the curvatures of the employed mirrors of the mirror module, which are respectively matched to the vehicle-specific curvatures of the windshields, allow the use of one and same head-up display in different vehicles.

In accordance with a further advantageous embodiment, provision is made for the respective curvature of the mirrors to be matched to respective vehicle-specific production tolerances of the windshield variants. Firstly, the dimensions and curvatures of the panes in themselves may vary slightly during the production of the panes, depending on the production tolerances that are specified. Modern windshields are usually produced as composite glass panes, which include a first pane and a second pane connected to one another by way of a film. Here, certain thickness tolerances or thickness variations may occur in such composite panes, wherein the respective curvatures of the mirrors may be matched to, for example, such vehicle-specific or windshield-variant-specific tolerances. Further, different dimensional tolerances may also be permitted when assembling the panes on the motor vehicle, and so the windshields are not always positioned in exactly the same way in relation to the motor vehicle. By way of example, this may also be taken into account by the respective curvatures of the mirrors.

In a further advantageous configuration, provision is made for the head-up display to include at least one folding mirror and at least one aspherical mirror, which, proceeding from the imaging unit, is disposed downstream of the folding mirror in the direction of the beam path, wherein the folding mirror and/or the aspherical mirror is embodied as the mirror module. The beam path is artificially lengthened by the optical system embodied by the folding mirror and the aspherical mirror. The aspherical mirror, which is also referred to as concave mirror, main mirror or correction mirror, parallelizes the light rays of the beam path in the process, usually magnifies the image of the head-up display and usually compensates distortions which arise from the curvature of the windshield. Here, the aspherical mirror may have a concave or convex embodiment. If the aspherical mirror has a concave embodiment, the latter magnifies the image provided by the imaging unit. If the aspherical mirror has a convex embodiment, the latter may lengthen the beam path. The beam path is folded by way of the folding mirror. What these measures achieve is that the virtual image displayed by using the head-up display becomes visible at a predetermined distance, for example at a distance of two meters from an observer, just above the hood of the motor vehicle. Depending on the packaging, i.e. the installation space situation within the motor vehicle, the mirror module may here embody the folding mirror and/or the aspherical mirror in order thus to facilitate matching of the head-up display to respective vehicle-specific windshield variants.

A further advantageous embodiment provides for the mirror module to have such a translationally movable embodiment that a distance in the direction of the beam path between the folding mirror and the aspherical mirror is modifiable for the purposes of modifying a virtual image distance. Thus, depending on the preference of the user, the mirror module may be moved such a way in a translational fashion that the virtual image distance may be modified in a simple fashion.

In accordance with a further advantageous embodiment, provision is made for the mirror module to have such a rotatable embodiment that the respective mirrors of the mirror module are pivotable into the beam path. As a result, the different mirrors with the respectively different curvatures may be moved into the beam path in a particularly simple manner.

In a further advantageous configuration, provision is made for the head-up display to include an actuator, by which the mirror module is twistable and/or translationally movable. Firstly, the mirror module may be positioned particularly precisely as a result thereof and, secondly, it may also be positioned particularly easily as desired.

A further advantageous embodiment provides for the head-up display to include an operating device, the actuator for moving the mirrors being actuatable by way of operating the operating device. By way of example, such an operating device may be arranged in a cockpit of the motor vehicle such that, for example, a driver, by operating the operating device, may modify the distance between the folding mirror and the aspherical mirror in such a way that his/her desired virtual image distance is set. Moreover, already during the assembly of the head-up display, it is also possible by operating the operating device for the mirror module to be twisted in such a way with the aid of the actuator that the mirror with the corresponding curvature, appropriate for the respective windshield variant, may be twisted into the beam path.

The motor vehicle described herein includes the head-up display described herein or an advantageous embodiment of the head-up display described herein.

The method described herein for arranging a head-up display in a motor vehicle includes: arranging at least one imaging unit of the head-up display in the motor vehicle, the imaging unit being embodied to emit an image in the form of a beam path, and providing at least one mirror module of the head-up display in the motor vehicle, the mirror module including at least two different mirrors and being embodied to deflect the beam path which is able to be emitted by the imaging unit. A respective curvature of the mirrors is matched to respective vehicle-specific windshield variants. The method further includes selecting the mirror whose curvature is matched to the windshield variant, embodied in a vehicle-specific manner, of the motor vehicle in which the head-up display is arranged, and arranging the selected mirror in a region through which the beam path extends in the case of an activated imaging unit.

Thus, by way of the method described herein, a windshield-specific and hence also vehicle-specific setup of the head-up display may occur in a particularly simple and reliable manner during the assembly of a motor vehicle, in particular during the assembly of a head-up display in the motor vehicle, by way of the appropriate alignment of the mirror module.

BRIEF DESCRIPTION OF THE DRAWINGS

These and other aspects and advantages, features and details, will become more apparent and more readily appreciated from the following description of the exemplary embodiments, taken in conjunction with the accompanying drawing of which:

An exemplary embodiment in the single drawing is a schematic view of a head-up display, by which a virtual image is displayed of an operator control device for actuating functional units of a motor vehicle.

DETAILED DESCRIPTION OF THE PREFERRED EMBODIMENT

Reference will now be made in detail to example embodiments which are illustrated in the accompanying drawing. Within the single DRAWING, elements that are the same or similar are provided with the same reference numeral.

The features and feature combinations specified above in the description and the features and feature combinations specified below in the description of the FIGURE and/or only shown in the FIGURE are usable not only in the respectively specified combination, but also in other combinations or on their own, without departing from the scope of the disclosure.

In the only FIGURE, the drawing shows a schematic illustration of a head-up display, by which a virtual image is displayed.

A head-up display, denoted overall by 10, is shown in a schematic illustration in the single FIGURE. The head-up display 10 includes an imaging unit 12, a folding mirror 14 and a mirror module 16. For example, the mirror module 16 may include three mirrors 18, 20, 22 with different curvatures, which are arranged at a main body 24 of the mirror module 16. As may be identified, the three different mirrors 18, 20, 22 are respectively arranged on different sides of the main body 24. Here, the mirror module 16 has an embodiment which is twistable or pivotable about an axis of rotation 26 in the direction of rotation denoted by the arrow 28. Here, the mirrors 18, 20, 22 may have either a concave or a convex embodiment.

The imaging unit 12 is embodied to emit a beam path 30. Here, the folding mirror 14 and the mirror module 16 form an optical system, by which the beam path 30 is artificially lengthened. For example, the mirror 18 may be arranged in such a way that the latter is moved into the beam path 30. The mirror 18 acts as an aspherical mirror, which is also referred to as concave mirror, and serves to parallelize the light rays of the beam path 30, magnify a virtual image 32 and compensate distortions which arise as a result of the curvature of a windshield 34. The beam path 30 is folded by way of the folding mirror 14. What these measures achieve is that the virtual image 32 becomes visible at a predetermined distance, for example of two meters distance from an observer 36, usually the driver, just above a hood of a motor vehicle.

Different motor vehicles usually also have vehicle-specific windshield variants. Here, the different mirrors 18, 20, 22 in each case have different curvatures, which are matched to respective vehicle-specific curvatures of respective windshield variants. Moreover, the curvatures of the different mirrors 18, 20, 22 may also be matched to respective vehicle-specific production tolerances of the different windshield variants.

Therefore, no components need to be replaced during the installation of the head-up display 10 in order to obtain matching to different windshield variants. Instead, only the appropriate mirror 18, 20 or 22, whose curvature is matched to the windshield variant, respectively embodied in a vehicle-specific manner, of the motor vehicle in which the head-up display 10 is intended to be arranged, is selected during the installation of the head-up display 10. After the arrangement of the mirror module 16 within the motor vehicle, the mirror module 16 needs merely to be twisted about the axis 26 in such a way that the mirror 18, 20, 22 appropriate for the windshield variant or the vehicle variant is arranged in the beam path 30.

Moreover, the mirror module 16 may be embodied in such a translationally movable manner that, for the purposes of modifying a virtual image distance 38, it is possible to modify a distance 40 in the direction of the beam path 30 between the folding mirror 14 and the mirror 18, 20, 22 of the mirror module 16 currently serving as aspherical mirror. Moreover, the head-up display 10 may include an actuator, by which the mirror module 16 is, firstly, twistable about the axis of rotation 26 and, additionally, translationally movable in the manner explained above. Moreover, the head-up display 10 may also include an operating device, by way of the operation of which the actuator is actuatable to move the mirror module 16, i.e., firstly, for pivoting purposes and, secondly, for translational movement purposes.

By way of example, such an operating device may be arranged in the vehicle interior of a motor vehicle such that, for example, a driver is able to actuate the actuator by operating the operating device such that the actuator in turn moves the mirror module 16 in a translational manner such that the virtual image distance 38 may be adapted as desired. Moreover, such an operating device may also serve to pivot the appropriate mirror 18, 20 or 22 into the region of the beam path 30 during the assembly of the head-up display 10 in a motor vehicle.

In the previously explained exemplary embodiments, the different mirrors 18, 20, 22 thus served as aspherical mirrors. However, instead, it is also possible for the mirror module 16 to be arranged in place of the folding mirror 14 and for a single mirror to be used as an aspherical mirror. Matching to different windshield variants then occurs in a manner analogous to what was explained above, wherein, merely, the mirror module 16 may now be moved in each case instead of the rigidly arranged folding mirror 14 such that the appropriate mirror 18, 20 or 22 is selected and positioned in a windshield-variant-specific manner.

The different mirrors 18, 20, 22 may also have an interchangeable embodiment—independently of whether the mirror module 16 is arranged at the position of the folding mirror or of the aspherical mirror—such that further mirrors with different angles of curvature may be attached to the mirror module 16 according to the customer's wishes and may be replaced with different mirrors.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A head-up display for a motor vehicle, comprising:
at least one light source configured to emit an image along a beam path; and
at least one mirror module configured to deflect the beam path emitted by the light source, the at least one mirror module comprising:
at least two different mirrors, movable into the beam path, having a respective curvature compatible with respective vehicle-specific windshield variants, one of the at least two different mirrors being moved into the beam path when the head-up display is disposed in a first vehicle variant having a first windshield variant, and another of the at least two different mirrors being moved into the beam path when the head-up display is disposed in a second vehicle variant having a second windshield variant.

2. The head-up display as claimed in claim 1, wherein the respective curvature of the at least two different mirrors accounts for respective vehicle-specific curvatures of the windshield variants.

3. The head-up display as claimed in claim 1, wherein the respective curvature of the at least two different mirrors accounts for respective vehicle-specific production tolerances of the windshield variants.

4. The head-up display as claimed in claim 1,
further comprising at least one folding mirror, and
wherein the at least two different mirrors include at least one aspherical mirror, which, with respect to the light source, is disposed downstream of the folding mirror in a direction of the beam path.

5. The head-up display as claimed in claim 4, wherein the at least one mirror module is translationally movable in the direction of the beam path to change a distance between the folding mirror and the aspherical mirror to thereby modify a virtual image distance at which a virtual image generated by the head-up display is displayed.

6. The head-up display as claimed claim 1, wherein the at least one mirror module is configured to be rotatable so that the at least two different mirrors are respectively pivotable into the beam path.

7. The head-up display as claimed in claim 1, further comprising an actuator configured to rotate and/or translationally move the at least one mirror module.

8. The head-up display as claimed in claim 7, further comprising an operating device configured to control operation of the actuator by using the operating device.

9. A motor vehicle, comprising:
a windshield; and
a head-up display, comprising:
at least one light source configured to emit an image along a beam path; and
at least one mirror module configured to deflect the beam path emitted by the light source, the at least one mirror module comprising:
at least two different mirrors, movable into the beam path, having a respective curvature compatible with respective vehicle-specific windshield variants, one of the at least two different mirrors being moved into the beam path when the head-up display is disposed in a first vehicle variant having a first windshield variant, and another of the at least two different mirrors being moved into the beam path when the head-up display is disposed in a second vehicle variant having a second windshield variant.

10. The motor vehicle as claimed in claim 9, wherein
the at least one mirror module further comprises a main body, and
the at least two different mirrors are disposed on different sides of the main body.

11. The motor vehicle as claimed in claim 10, wherein
the main body is configured to rotate about an axis of rotation,
when the main body is in a first position a first mirror among the at least two different mirrors is disposed to deflect the beam path emitted by the light source and a second mirror among the at least two different mirrors is disposed away from the beam path, and
when the main body is rotated from a first position to a second position the second mirror is disposed to deflect the beam path emitted by the light source and the first mirror is disposed away from the beam path.

12. The motor vehicle as claimed in claim 11, wherein when the main body is in the first position the first mirror deflects the beam path emitted by the light source toward the windshield.

13. The motor vehicle as claimed in claim 11, wherein the head-up display further comprises an operator control device, disposed in an interior of the motor vehicle, configured to cause the main body to rotate.

14. The motor vehicle as claimed in claim 9, wherein the head-up display further comprises a folding mirror configured to deflect the beam path emitted by the light source toward the at least two different mirrors.

15. The motor vehicle as claimed in claim 13, wherein the head-up display further comprises an actuator that when actuated, changes a distance between the folding mirror and the at least two different mirrors to thereby modify a virtual image distance at which a virtual image generated by the head-up display is displayed.

16. A method for arranging a head-up display in a motor vehicle, the method comprising:
arranging a light source of the head-up display in the motor vehicle, the light source being configured to emit an image along a beam path;
providing at least one mirror module of the head-up display in the motor vehicle, the at least one mirror module comprising at least two different mirrors and being configured to deflect the beam path emitted by the light source, wherein a respective curvature of the at least two different mirrors is compatible with respective vehicle-specific windshield variants, one of the at least two different mirrors being moved into the beam path when the head-up display is disposed in a first vehicle variant having a first windshield variant, and another of the at least two different mirrors being moved into the beam path when the head-up display is disposed in a second vehicle variant having a second windshield variant;
selecting one of the at least two different mirrors having a curvature compatible with a windshield variant of the motor vehicle in which the head-up display is arranged; and
arranging the mirror so that the mirror deflects the beam path when the light source emits the image in the form of the beam path.

17. The method as claimed in claim 16, wherein the at least one mirror module further comprises a main body, and the at least two different mirrors are disposed on different sides of the main body.

18. The method as claimed in claim 17, wherein the arranging comprises:
rotating the main body from a first position to a second position such that the mirror is arranged to deflect the beam path and another mirror among the at least two different mirrors is arranged away from the beam path.

19. The method as claimed in claim 17, wherein the mirror deflects the beam path emitted by the light source toward the windshield variant of the motor vehicle.

20. The method as claimed in claim 17, wherein the head-up display further comprises a folding mirror configured to deflect the beam path emitted by the light source toward the at least two different mirrors, and
the method further comprises moving at least one of the folding mirror and the main body such that a distance between the folding mirror and the at least two different mirrors is changed to thereby modify a virtual image distance at which a virtual image generated by the head-up display is displayed.

* * * * *

UNITED STATES PATENT AND TRADEMARK OFFICE
CERTIFICATE OF CORRECTION

PATENT NO. : 10,018,842 B2
APPLICATION NO. : 15/512437
DATED : July 10, 2018
INVENTOR(S) : Matthias Wunderlich et al.

Page 1 of 1

It is certified that error appears in the above-identified patent and that said Letters Patent is hereby corrected as shown below:

In the Claims

Column 6, Line 42:
In Claim 6, after "claimed" insert -- in --.

Signed and Sealed this
Eighteenth Day of September, 2018

Andrei Iancu
*Director of the United States Patent and Trademark Office*